United States Patent [19]

Bottum, Jr. et al.

[11] Patent Number: 5,076,313
[45] Date of Patent: Dec. 31, 1991

[54] FUSIBLE PLUG STRUCTURE

[76] Inventors: Edward W. Bottum, Jr.; Edward W. Bottum, Sr., both c/o Refrigeration Research, Inc., 522 N. Fifth St., Brighton, Mich. 48116

[21] Appl. No.: 578,207
[22] Filed: Sep. 6, 1990
[51] Int. Cl.$^5$ .............................................. F16K 17/40
[52] U.S. Cl. .................... 137/74; 285/332.2; 285/379; 285/917
[58] Field of Search ................ 137/72, 74; 285/379, 285/332.2, 332.3, 917

[56] References Cited

U.S. PATENT DOCUMENTS

| | | | |
|---|---|---|---|
| 954,549 | 4/1910 | Turner | 285/332.3 |
| 1,133,320 | 3/1915 | Rockwood | 285/332.3 |
| 2,362,686 | 11/1944 | DeLano | 285/332.3 |
| 2,696,395 | 12/1954 | Ellis | 285/332.3 |
| 3,139,103 | 6/1964 | Bottum | 137/72 |
| 3,139,294 | 6/1964 | Richards, Jr. | 285/379 X |
| 3,396,995 | 8/1968 | Burnside | 285/379 X |
| 3,413,017 | 11/1968 | Hughey | 285/379 X |
| 3,492,834 | 2/1970 | Grantham | 285/332.3 X |
| 4,570,981 | 2/1986 | Fournier et al. | 285/332.3 |

*Primary Examiner*—John Rivell
*Attorney, Agent, or Firm*—Bertram F. Claeboe

[57] ABSTRACT

A fusible plug structure is provided for use on a refrigeration system component. Among the features of the invention is means of a novel character for connecting a gasket or sealing member to one end of a fusible plug body, which assures a proper and effective seal when the plug body is assembled with a companion female fitting member fixed to the refrigeration system component. The connecting means markedly facilitates proper placement of the sealing member regardless of the particular position of the female fitting and supporting refrigeration system component. The connecting means may take various forms, and illustrative thereof is a substance such as oil or grease. Alternatively, one end of the fusible plug body may be so configured as to receive the sealing member in close fitting contact therewith. The sealing member itself may be variously configured. It is also within the purview of the invention, in order to avoid excessive rotation of the gasket or sealing member with respect to a mating surface within the female fitting, to provide restraining means on the mating surface. By so proceeding, or by other variations to the invention, galling of the sealing member is substantially entirely eliminated.

2 Claims, 1 Drawing Sheet

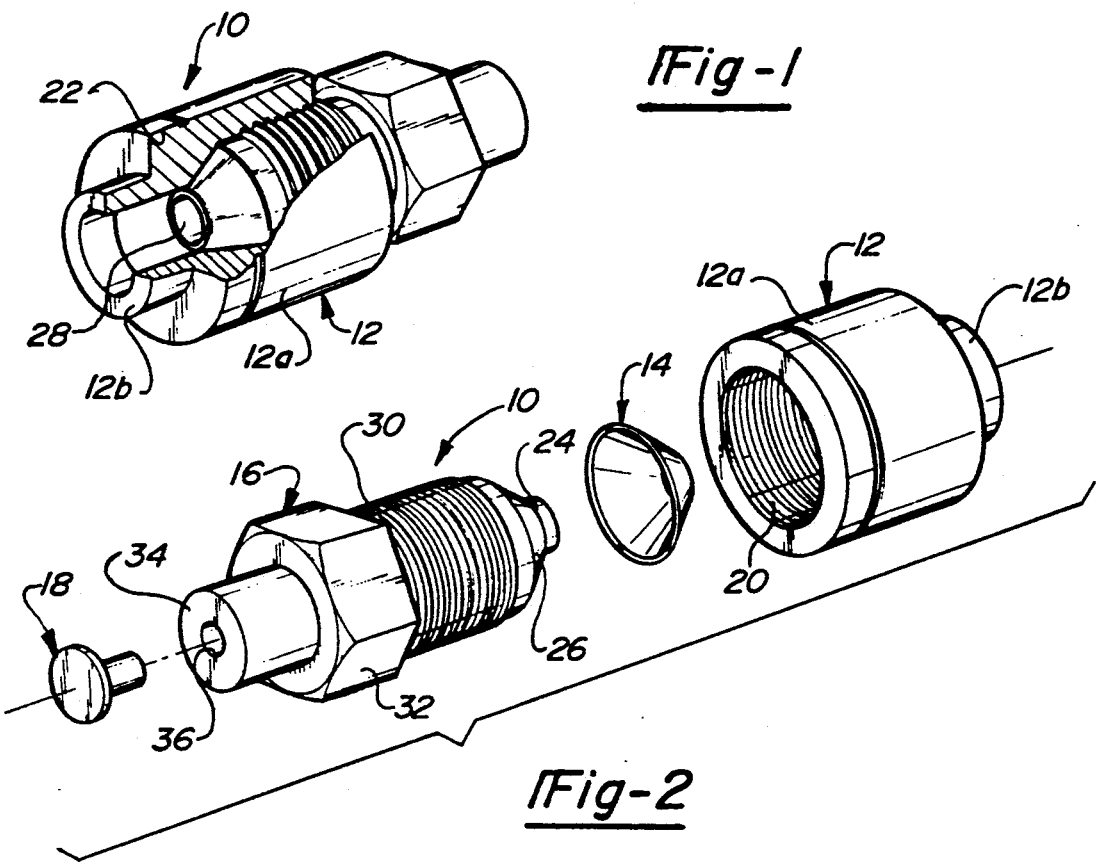
Fig-1
Fig-2
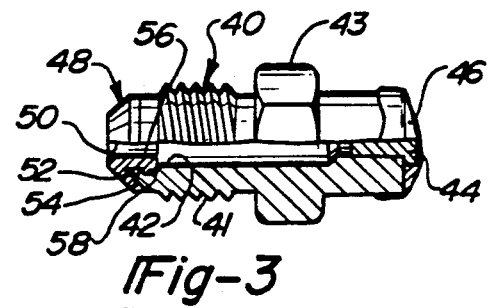
Fig-3
Fig-4
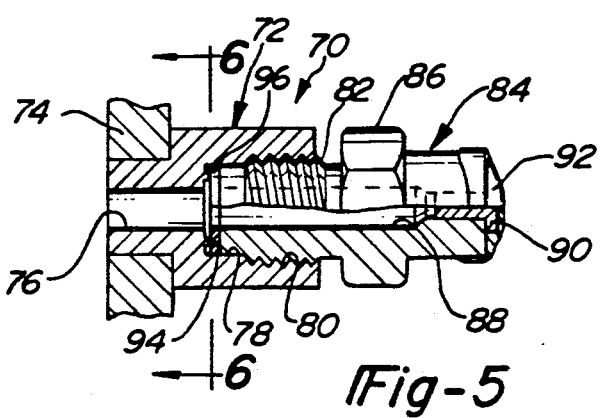
Fig-5
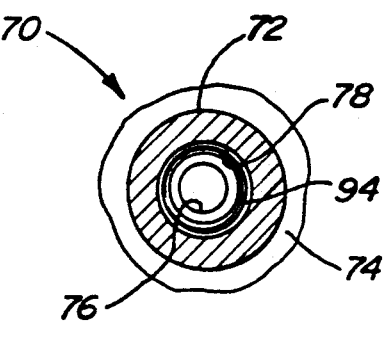
Fig-6

FUSIBLE PLUG STRUCTURE

BACKGROUND OF THE INVENTION

It is known in the art of refrigeration systems to employ in conjunction with suction accumulators, receivers, and related components fusible plugs in order to relieve gas pressure when the ambient temperature reaches an extremely high level, such as during a fire. In U.S. Pat. No. 3,139,103, which issued June 30, 1964 in the name of one of the present applicants, the prior art relating to this subject is described, and reference is now made thereto for background information.

As is set forth in this patent, and prior to the invention disclosed therein, fusible plugs of the past were generally secured to a refrigeration system component by assembly with a female pipe fitting permanently secured to the component. The fitting had an axial passage therethrough, one end of which was internally threaded for mating engagement with an externally threaded fusible plug. Disadvantageously, due to thread tolerances between the fittings and fusible plugs, deformation of the threads was necessary in order to provide a seal therebetween. This deformation frequently created stresses within the fusible plug, sufficient to cause leaks around the fusible material therein.

The expedient of placing sealant on the threads of the fittings and/or fusible plugs was found to be ineffective. The apparent reason therefore was that the sealing compounds employed often deteriorated on exposure to refrigerant, thereby producing delayed leaks of refrigerant around the fusible plugs.

Leakage and other problems associated with the fusible plug structure just described were effectively eliminated by provision of the fusible plug disclosed in U.S. Pat. No. 3,139,103. As shown therein, the plug has a male flare to connect to a female flare on the receiver or accumulator. A soft copper gasket, which is generally oiled, is used, and pipe compound is eliminated. The result is a permanent leak-tight connection at the threads.

Additionally, in the patented structure, the alloy constituting the fusible material is located so that it is not disturbed or under stress when the plug is tightened. This is because the section of the plug containing the alloy is not the threaded section to which tightening forces are applied. By use of an eutectic alloy and the absence of significant distortion thereof, the relief temperature is positive.

While the fusible plug just described has functioned effectively in actual practice, it has been noted that certain marked improvements can be made therein. First, in some cases, depending upon the positioning of the female fitting attached to the refrigeration system component, it is inconvenient or possibly difficult to properly insert the copper gasket. This gives rise to the possibility of leakage. Second, upon occasion during installation the gasket or seal may rotate relative to the female sealing surface upon the fitting, rather than only upon the male sealing surface on the plug itself. This may cause galling of the copper gasket, since generally the male sealing surface on the plug is more smooth or dimensionally stable, as compared with the female sealing surface on the fitting.

SUMMARY OF THE INVENTION

In accordance with the novel concepts of the present invention, there is provided a fusible plug structure having among its features means connecting a sealing member or gasket to one end of the fusible plug body, and effective during assembly of the plug body with a fitting member on a refrigeration system component, to assure a proper and effective sealing relationship between the assembled parts. The connecting means, which assures proper placement of the sealing member regardless of the positioning of the fitting member, may take various forms. A substance exemplified by oil, grease, cement, or solder may be employed, or one end of the fusible plug body may be so configured as to receive the sealing member in close fitting contact therewith. Excessive rotation of the sealing member with respect to a mating surface within the fitting member may also be avoided by provision of restraining means on the mating surface thereof. These and other novel means for surmounting the prior art inadequacies will be described in more detail as the description now proceeds.

BRIEF DESCRIPTION OF THE DRAWINGS

FIG. 1 is a partially fragmented side elevational view of one form of the present invention;

FIG. 2 is an exploded perspective view of the fusible plug structure of FIG. 1;

FIG. 3 is a side elevational view, partially in section, showing another form of applicant's invention;

FIG. 4 is an elevational view, partially broken away and partially taken in section, showing in particular a modified form of sealing member;

FIG. 5 is a side elevational view, partially in section, illustrating a further form of applicants' invention; and FIG. 6 is a vertical sectional view, taken substantially along the line 6—6 of FIG. 5.

DESCRIPTION OF A PREFERRED EMBODIMENT

Referring now to the drawings, and first to FIGS. 1 and 2 thereof, a fusible plug structure embodying the novel concepts of this invention is designated generally by the numeral 10. The structure 10, as better shown in FIG. 2, comprises fitting member 12, gasket or sealing member 14, plug member 16, and rivet or like plug means member 18, the eutectic alloy not being shown in these views, although it will later be described herein.

The fitting member 12 is preferably of steel construction, and is configured for fixed securement to a refrigeration vessel (not shown). The fitting 12 is shaped to include a generally cylindrical body portion 12a and integral generally cylindrical reduced diameter neck or shank portion 12b. Body portion 12a of the fitting member 12 is interiorly threaded as at 20, and also internally of the body portion 12a there is provided an annular tapered surface 22 for close fitting contact with gasket or sealing member 14, upon assembly of the parts shown in FIG. 2 into the fusible plug structure 10 of FIG. 1.

The gasket member 14 is preferably of copper construction, and is substantially frustro-conically shaped as shown for close fitting encircling contact with relatively short length cylindrical neck portion 24 and tapered shoulder portion 26 of axially passaged plug member 16. The neck and shoulder portions 24 and 26, respectively, of the plug member 16 are so dimensioned with respect to the frustro-conical sealing member 14 that upon assembly of the gasket upon the plug member, the neck portion 24 protrudes slightly from the gasket member 14. This apertured protrusion is rolled over or otherwise shaped to provide an annular rim-like bead or collar 28 (FIG. 1) which properly located the gasket member 14 upon the plug member 16, while still permitting free rotative movement thereon. In this manner, the gasket or seal member 14 may be accurately positioned within the female fitting 12 in sealing relationship with the tapered wall surface 22 thereof, and with little likelihood of galling of the surfaces of the copper gasket 14, since free rotation of the gasket upon the plug member 16 is provided by this invention.

The plug member 16 is preferably of brass construction, and is externally threaded as at 30 for threadable engagement with interiorly threaded fitting member 12. Integrally formed upon the plug member is a wrench engageable head 32 for tightening the plug member 16 within the female fitting member 12. Also integral with the plug member is a reduced diameter end portion 34 passaged as at 36 for receiving rivet means 18 or like device for closing the passage 36. As will later be apparent when reference is made to other views of the drawings, the rivet means 18 or like metal plug means, when positioned in passage 36, is essentially entirely covered by a melted body of an eutectic alloy constituting the fusible material. It is also within the purview of this invention that the fusible material itself may be the plug means, and in this case the alloy would be poured while molten into the passage 36, or otherwise located therein.

A modified form of plug member is shown in FIG. 3, being designated generally therein by the numeral 40. As in the embodiment of the invention illustrated in FIGS. 1 and 2, the plug member 40 is provided with an axial bore or passage 42 extending therethrough, one end of which receives a rivet member or like means 44 normally held in position by a body of fusible material 46 in the form of an eutectic alloy. The opposite end of the plug member 40 mounts for free rotation thereon gasket or seal member 48. As appears in FIG. 3, the plug member 40 is externally threaded as at 41, and is formed to provide a wrench engageable head 43.

The gasket member 48 has an opening 50 therethrough communicating with the plug member axially directed passage 42, and is shaped to include an angularly outwardly directed flange portion 52 in rotative contact with tapered head portion 54 on the plug member 40. The gasket or seal member is further shaped with an annular collar portion 56 received in annular groove 58 in the plug member 40. In common with the inventive embodiment of FIGS. 1 and 2, the structure shown in FIG. 3 provides accurate positioning of the gasket member within a female fitting member regardless of the particular position of the latter member, and galling of the copper gasket member is effectively avoided.

Like advantageous results are achieved by the gasket or seal member 60 shown in FIG. 4. In this embodiment of the invention, gasket member 60 is formed with a relatively short length tubular body portion 62 and angularly outwardly directed flange portion 64. The seal member 60 is received within an axially bored plug member (not shown) generally in the manner of FIG. 3, and possesses the same advantage discussed in connection therewith. If desired, in the form of the invention shown in FIG. 4, a substance such as oil or grease or like means may be employed between the seal member and plug member to improve upon the accurate positioning of the seal member within the contours of the female fitting member.

Referring now to FIGS. 5 and 6, another form of temperature responsive device or fusible plug structure embodying the present invention is shown, being designated generally therein by the numeral 70. The structure 70 comprises a female fitting member 72 adapted to be fixedly secured to a refrigeration vessel 74, the fitting member 72 having a stepped axial passage formed therethrough providing a relatively small diameter portion 76 and a relatively larger diameter portion 78. The latter portion 78 along the wall structure thereof is formed with a threaded section 80 for receiving threaded portion 82 on plug member 84. The plug member 84 is shaped to include a wrench engageable head 86, and extending axially through the length of the plug member is passage 88, one end of which receives a rivet member on like plug means 90 held in position by a body of fusible material 92.

Interiorly of the fitting member 72, and essentially at the base of the relatively larger diameter portion or cavity 78 formed therein, an annular ridge 94 is formed against which during assembly of the parts shown a relatively flat or washer-like gasket or sealing member 96 is located. The annular ridge 94 in combination with the copper annular gasket 96 provides a positive seal between the fitting member 72 and plug member 84. As well, the annular ridge 94 or the substitution therefore of an 0-ring or like means, minimizes contact between the fitting member 72 and gasket 96, so that there is little likelihood of galling. A substance such as oil or grease may of course be used to improve adherence of the gasket to the plug member during assembly of the parts, and also to assure free rotation of the gasket relative to the plug member.

Various changes and modification to the invention have been noted herein, and these and other variations may of course be practiced without departing from the spirit of the invention or the scope of the subjoined claims.

We claim:

1. A fusible plug structure for use in refrigeration systems, comprising an externally threaded axially passaged plug member formed at one end with a tapered shoulder portion and a relatively short length reduced diameter cylindrical neck portion extending outwardly therefrom, a frusto-conical copper sealing member surrounding said neck portion and seated upon said tapered shoulder portion in freely rotative relation therewith, means integral with said reduced diameter neck portion positioning said sealing member upon said tapered shoulder portion of said plug member in circumferentially surrounding relation with said neck portion of said plug member, and an internally threaded axially passaged fitting member for fixed attachment to a component of a refrigeration system, said fitting member having an annular generally conical cavity formed therein for receiving said sealing member and said plug member in sealing relationship therewith, said positioning means being effective to accurately locate said sealing member with respect to the generally conical cavity in said fitting member regardless of the particular position of said fitting member on the refrigeration system component, said sealing member by reason of its free rotation on said plug member being relatively free of galling damage thereto during threadable association of said fitting member.

2. A fusible plug structure as defined in claim 1, in which the positioning means is an annular rolled over collar formed by one end of said reduced diameter neck portion circumferentially restraining said sealing member by contact therewith, while permitting free rotation of said sealing member upon said plug member.

* * * * *